(12) United States Patent
Kravitz et al.

(10) Patent No.: US 8,385,827 B2
(45) Date of Patent: Feb. 26, 2013

(54) TECHNIQUES FOR AUGMENTED FUNCTIONALITY BY SHARING WIRELESS RESOURCES

(75) Inventors: Lior Kravitz, Kfar Bilu (IL); Ran Mor, Petach-Tikva (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/034,065

(22) Filed: Feb. 24, 2011

(65) Prior Publication Data

US 2012/0220217 A1 Aug. 30, 2012

(51) Int. Cl.
*H04B 7/00* (2006.01)

(52) U.S. Cl. .................. 455/41.2; 455/557

(58) Field of Classification Search .......... 455/41.2, 455/41.3, 418–420, 423, 552.1, 553.1, 566, 455/557; 345/689, 650, 204, 205
See application file for complete search history.

(56) References Cited

U.S. PATENT DOCUMENTS

| | | | |
|---|---|---|---|
| 7,987,489 B2 * | 7/2011 | Krzyzanowski et al. ....... 725/80 |
| 2004/0114538 A1 * | 6/2004 | Bouet ............................ 370/254 |
| 2004/0171378 A1 * | 9/2004 | Rautila .......................... 455/419 |
| 2005/0124329 A1 | 6/2005 | Yadav |
| 2006/0133415 A1 * | 6/2006 | Mueller ........................ 370/466 |
| 2006/0209821 A1 | 9/2006 | Jung et al. |
| 2007/0147338 A1 | 6/2007 | Chandra et al. |
| 2007/0275696 A1 * | 11/2007 | Cheng et al. ............... 455/412.1 |
| 2008/0123683 A1 * | 5/2008 | Cheng et al. .................. 370/464 |
| 2008/0127181 A1 * | 5/2008 | Allard et al. ...................... 718/1 |
| 2008/0141064 A1 * | 6/2008 | Reich et al. ........................ 714/2 |
| 2008/0252415 A1 * | 10/2008 | Larson et al. .................. 340/5.73 |
| 2008/0310421 A1 * | 12/2008 | Teisberg et al. ........... 370/395.53 |
| 2009/0022117 A1 * | 1/2009 | Quigley et al. ................ 370/338 |
| 2009/0086742 A1 * | 4/2009 | Ghai et al. ...................... 370/401 |
| 2009/0170472 A1 | 7/2009 | Chapin et al. |
| 2009/0268738 A1 * | 10/2009 | Tchapda ........................ 370/392 |
| 2010/0169948 A1 * | 7/2010 | Budko et al. ...................... 726/1 |
| 2010/0198994 A1 * | 8/2010 | Lee .................................... 710/5 |
| 2010/0306528 A1 * | 12/2010 | Andress et al. ............... 713/153 |
| 2011/0145458 A1 * | 6/2011 | Narasimhan .................. 710/260 |
| 2011/0161409 A1 * | 6/2011 | Nair et al. ...................... 709/203 |

(Continued)

FOREIGN PATENT DOCUMENTS

WO 2012/115816 A2 8/2012

OTHER PUBLICATIONS

International Search Report and Written Opinion Received for PCT Patent Application No. PCT/US2012/024975, mailed on Sep. 27, 2012, 9 pages.

*Primary Examiner* — Dominic E Rego
(74) *Attorney, Agent, or Firm* — Ellis B. Ramirez; Prass LLP

(57) ABSTRACT

An embodiment of the present invention provides an apparatus, comprising, a wireless platform adapted for communication with at least one additional wireless platform, wherein the wireless platform and the at least one additional wireless platform each have their own set of wireless communication devices and capabilities, wherein at least one of the wireless communication devices and capabilities are in common between the wireless platform and the at least one additional wireless platform, and wherein when the wireless platform and the at least one additional wireless platform are within communication range of each other or are on at least one common wireless communication protocol, the wireless platform is capable of virtualizing to the wireless platform some or all wireless devices and capabilities available on the at least one additional wireless platform.

27 Claims, 6 Drawing Sheets

U.S. PATENT DOCUMENTS

2011/0179136 A1*  7/2011  Twitchell, Jr. ................ 709/217
2011/0286380 A1* 11/2011  Zhu .............................. 370/315
2012/0051296 A1*  3/2012  Kokku et al. ................. 370/329
2012/0058721 A1*  3/2012  Fok et al. ..................... 455/41.1
2012/0124171 A1*  5/2012  Sparks .......................... 709/219
2012/0147824 A1*  6/2012  Van Der Merwe et al. ... 370/329

* cited by examiner

TECHNIQUES FOR AUGMENTED FUNCTIONALITY BY SHARING WIRELESS RESOURCES

BACKGROUND

Despite vast improvements in wireless communication and more specifically in wireless multi-communication technologies, there are a number of limitations prevalent, including: limited range of wireless communications; limited features available on any specific platform (for example: not all comms are built in; limited set of supported profiles; limited platform resources available; support for distributed computing over wireless link; and others); and reduced/impaired functionality and performance when more than one communications device is operating.

Thus, a critical need is prevalent for techniques for augmented functionality and improved performance in multi-communication wireless devices.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
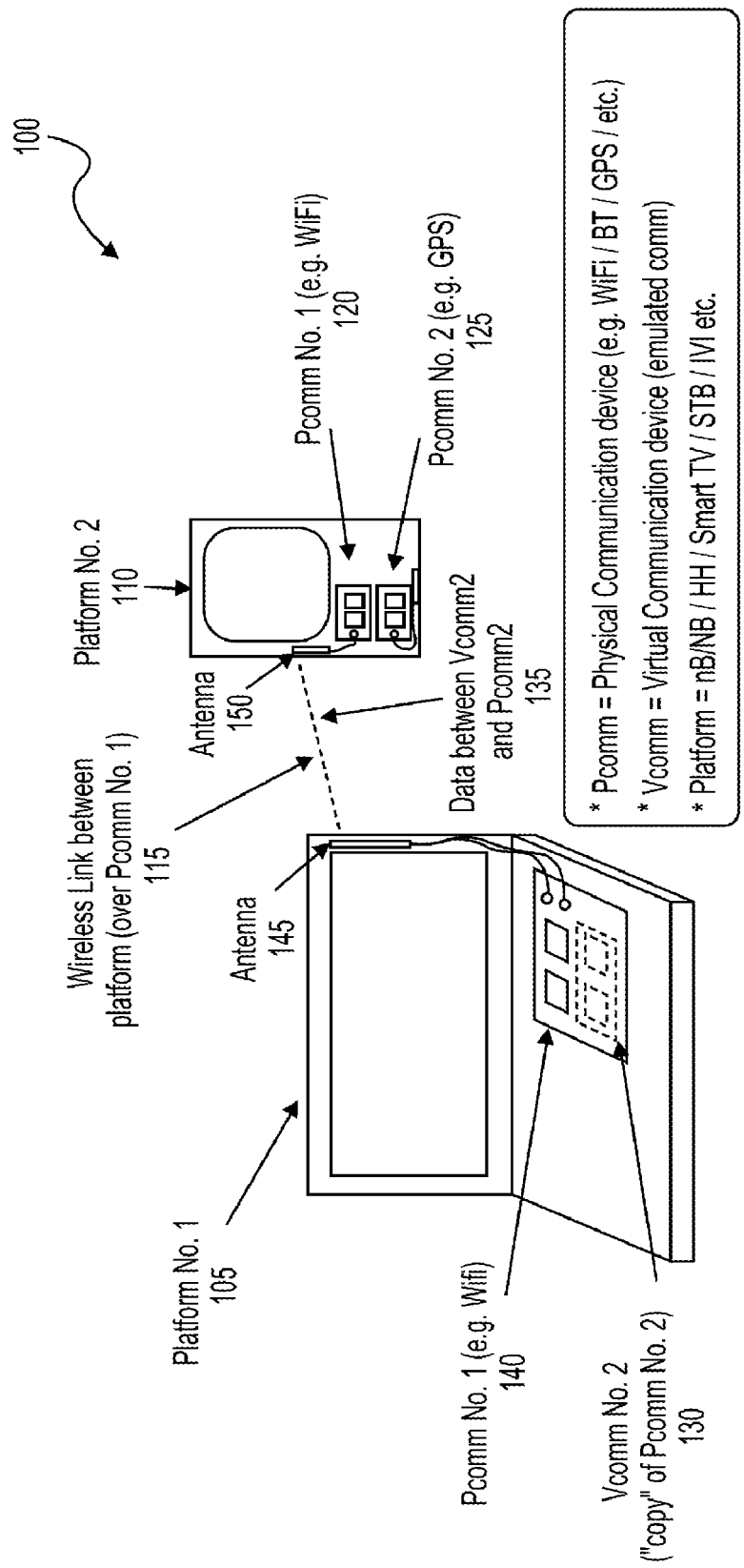
FIG. 1 illustrates two platforms using a Comm's Cloud to share a wireless device or capability over an existing communication link according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention may provide an extension technology for multi-communication (also may be referred to herein as "multi-comm") wireless platforms. Although not limited in this respect, embodiments of the present invention may be used to solve an array of problems including: Limited range of wireless communications; Limited features available on any specific platform; and reduced/impaired functionality and performance when more than one communications device is operating (coexistence).

Regarding limited range, this problem is hard to solve, mainly due to regulatory limits on the power levels allowed to be transmitted from wireless devices. For some of the available communications protocols, "repeaters" are available as after-market additions that both cost money and need to be well-placed (and often require a power supply). In other cases, custom antennas or power amplifiers are offered, not always with the due attention to the risks of increased exposure to electro-magnetic radiation. Some devices portend to have "extended range" features, either by improving the receiver sensitivity levels or by lowering the data rate, but such benefits are limited, especially in an inter-operable environment, where not all devices are manufactured by the same company.

Regarding limited features, there is a constant desire to expand and improve the availability of features and protocols in wireless multi-communications. However, this has an associated cost to the end-users, who are not always happy to pay more for their device. This also has an impact on platform size, and often on battery life, which are of the most important parameters for many choosing a mobile platform. There are a few genuine "feature extension" products available in the market, centered around two categories—one is for dedicated external GPS receivers, who can be connected to other devices via a Bluetooth® link. This feature, however, is rarely (if ever) available in complete platforms. The other category is the one of "internet connection sharing", which enables (via software running on the platform's operating system [OS]) to share an internet connection received over one communications link (usually wired local area network [LAN]) to be shared over another communications link (for instance Wireless LAN). This, however, is a limited feature, which doesn't cover many of the common use cases, and is implemented in a relatively high software level, not enabling Quality of Service control and other important parameters.

Regarding coexistence, this is a relatively new field in wireless communications, which emerged out of the integration and features inclusion of recent years. There are two basic ways in which coexistence issues are currently solved. The first, and the more obvious one, is by increasing the separation and isolation between the different antennas. This approach becomes less efficient as platforms become smaller (notebooks to netbooks to smartphones), and as the number of different communications protocols available on each platform increases (platforms with five or more different radios are available today). As users demand even more features in ever-smaller devices, this approach is rapidly arriving at a dead-end. The other approach, most commonly used in WiFi-Bluetooth® coexistence, is by defining a protocol by which the two communications devices "share the air", usually through some sort of TDM (time-division-multiplex). This approach, however, usually requires industry acceptance to work well (in order to allow both devices to still meet their respective requirements, and be inter-operable), and will always be associated with a certain degree of performance degradation.

Embodiments of the present invention improve the limited range problem in that it enables every platform to act as an opportunistic "repeater" without the need to install dedicated SW or buy extra HW by the end-user. It enables achieving an extended range in a fully interoperable way as far as the end connection point (e.g. WiFi access point), as long as this invention is incorporated both into the user's platform, and into the intermediate "repeater" platform. When configured properly, this can be performed completely transparent to a user.

Embodiments of the present invention improve the aforementioned limited features by enabling a user to use on one platform, capabilities and features available on another platform. This extends the usability of each platform individually, without having to load every platform with the full set of features. As long as consumers keep having (and often carrying) more than one communicating platform (phone and notebook, tablet and camera, netbook and smart TV, etc.) there will be a cost benefit to not needing to buy all extra features for all of them.

Embodiments of the present invention improve the aforementioned coexistence issue by using a Comm's Cloud approach. Comm's cloud may be defined as, but is not limited to, sharing of resources and/or capabilities between platforms over a wireless link, in a manner as transparent to the user and the operating system as required, enabling the creation of a single logical entity from two or more physical platforms/devices. The main difference in the Comm's Cloud approach to coexistence vs. previous approaches is that it is opportunistic. The "old" methods still need to be implemented and used to handle cases where another platform capable of "off-loading" the limiting link is not available. But when such a platform is available, it provides an immediate, measurable improvement in performance. The concept is in essence one of antenna separation, only in the Comm's Cloud case the antenna is placed in a separate platform, and a difficult problem is traded with a simpler one.

Embodiments of the present invention relate to situations where two or more platforms, each with its own set of wireless communications devices/capabilities (at least one of which must be common between the two, to enable communication between them) are within communication range of each other (on at least one common wireless communications protocol). Under such conditions, when both platforms are equipped with the required hardware and software functions, the common wireless device on each platform can virtualize to its platform some or all wireless devices and capabilities available on the other platform, through the common communications link. When this is done, one platform can seamlessly use devices and capabilities which are physically on a second platform; connect to other platforms or access devices which are within range of the second platform; and transfer connections to other devices to the second platform.

Turning now to the figures, FIG. 1, shown generally as 100, provides a basic scenario of embodiments of the present invention: two platforms 105 and 110 maintaining a wireless communications link 115 (each using a physical device, e.g. WiFi adapter, to establish and maintain the link), where one platform includes another physical device. It is understood that the present invention is not limited to any particular number of platforms and the description of using two or three platforms herein is illustrative only. By using this invention, a virtual device may be created on platform no. 1 (105 in the figures), which is a copy of device no. 2 (125 in the figures) on platform no. 2 (110 in the figures). This virtual device 130 is maintained and used by transferring data over the communication link 135 between device no. 1 (140 in the figures) on platform no. 1 (105 in the figures) and device no. 1 (120 in the figures) on platform no. 2 (110 in the figures). Devices no. 1 (120 in the figures) and 2 (125 in the figures) on platform no. 2 (110 in the figures) can either be physically separate devices, or two communications devices integrated into the same module, or in the same multi-comm chip. Antenna for platform no. 1 (105 in the figures) is shown at 145 and antenna for platform no. 2 (110 in the figures) is shown at 150. Data transfer between Vcomm2 (130 in the figures) and Pcomm2 (125 in the figures) is shown at 135.

In order to create and maintain the virtual device, the following components may be required at one or both of the platforms:

A combination of hardware (HW) and/or software (SW) capabilities in device no. 1 (140 in the figures) and its device driver (not shown), that is capable of supporting the creation of virtual devices (e.g., Vcomm No. 2 (130 in the figures) on Platform 1, which is a copy of Pcomm no. 2 (125 in the figures) on platform no. 2 (110 in the figures) on platform no. 1 (105 in the figures) as seen by the operating system.

A combination of HW and/or SW capabilities in device no. 1 (140 in the figures) and its device driver to create and maintain a link/tunnel between device no. 1 (140 in the figures) on platform no. 1 (105 in the figures) and device no. 1 (120 in the figures) on platform no. 2 (110 in the figures), which is dedicated for routing data between device no. 2 (125 in the figures) on platform no. 2 (110 in the figures) and its virtual copy 130 on platform no. 1 (105 in the figures).

A combination of HW and/or SW capabilities in device no. 1 (140 in the figures), its device driver and the virtual device 130, that route data traffic between the virtual device 130 and the OS, making use of the link/tunnel 115 to device no. 2 (125 in the figures) on platform no. 2 (110 in the figures).

A combination of HW and/or SW capabilities in device no. 1 (120 in the figures) and device no. 2 (125 in the figures) on platform no. 2 (110 in the figures), and their device driver(s) to create and maintain a link/tunnel 115 between device no. 1 (120 in the figures) and device no. 2 (125 in the figures) on platform no. 2 (110 in the figures), which is dedicated for routing data between device no. 2 (125 in the figures) on platform no. 2 (110 in the figures) and its virtual copy 130 on platform no. 1 (105 in the figures). In case devices no. 1 (120 in the figures) and 2 (125 in the figures) are part of the same physical module, such HW capability can be built-in. In case they are on separate cards/modules, making a HW connection may require some dedicated HW at the platform level.

A combination of HW and/or SW capabilities in device no. 1 (120 in the figures) and device no. 2 (125 in the figures) on platform no. 2 (110 in the figures), and their device driver(s) to route data to and from device no. 2 (125 in the figures), from and to either platform no. 2 (110 in the figures), or platform no. 1 (105 in the figures) through device no. 1 (120 in the figures) (through the dedicated link/tunnel 115), or both.

A combination of HW and/or SW capabilities in device no. 1 (120 in the figures) and device no. 2 (125 in the figures) on platform no. 2 (110 in the figures), and their device driver(s) to route data arriving over the air or generated within the device to device no. 2 (125 in the figures), either to device no. 2 (125 in the figures) (if it arrives on the dedicated link/tunnel 115) or to the platform 110.

In the case of "Feature Extension" where the desired feature is not a communications device (but rather a storage, memory, processing, sensing or other device) the requirements above still apply as-is, except for data arriving "over the air".

Figure 2:
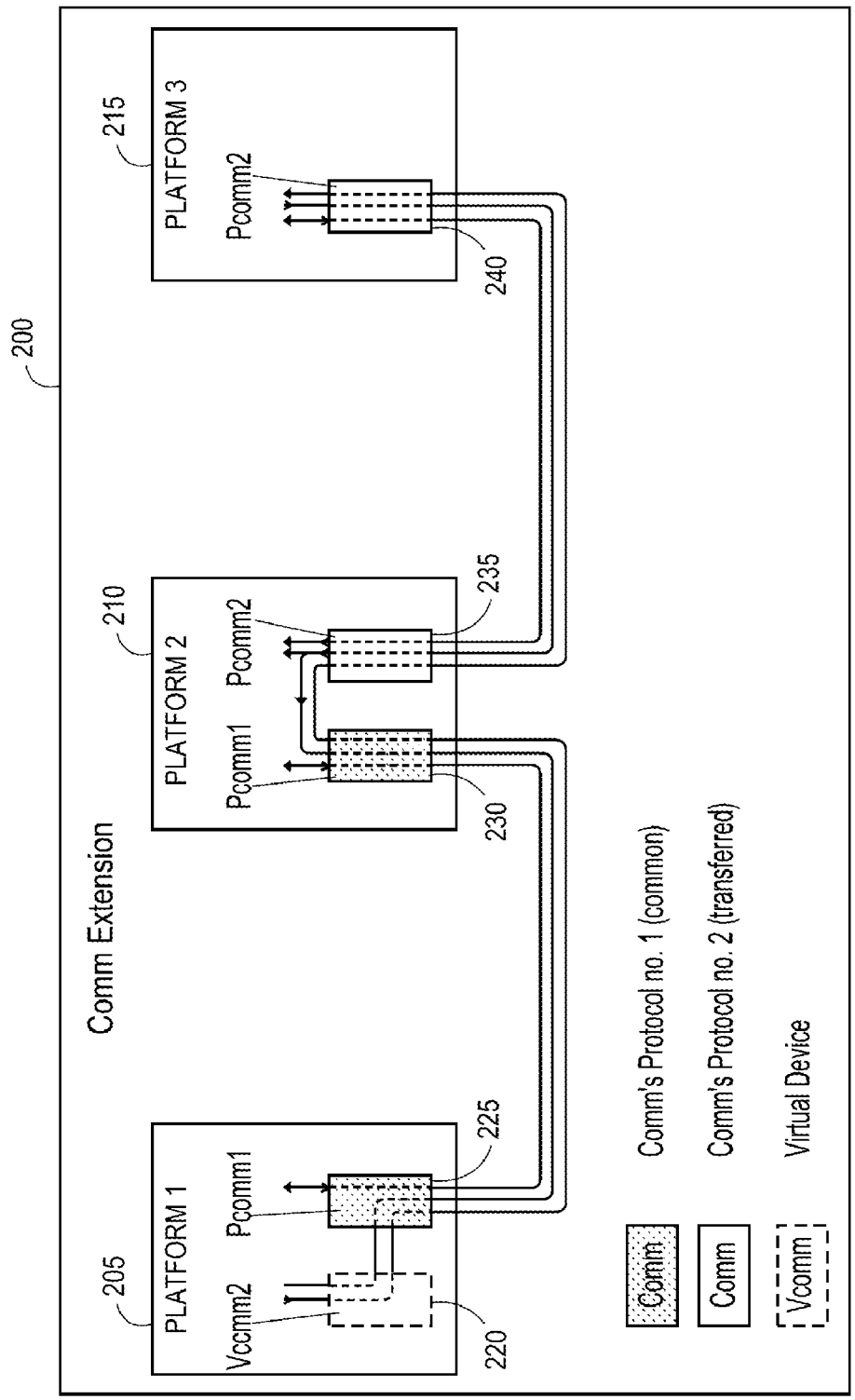
FIG. 2 shows a Comm's Cloud used for comm extension, adding Comm2 capability to Platform 1 according to embodiments of the present invention.

Turning now to FIG. 2, generally to 200, is illustrated a network diagram of the "feature extension" use-case, in which a virtual Comm2 device 220 is created in Platform 1 (205 in the figures), and maintained using a link through Comm1 devices 225 and 230 in Platform 1 (205 in the figures) and Platform 2 (210 in the figures), to the physical Comm2 device 235 in Platform 2 (210 in the figures) which is in communication with platform 3 (215 in the figures) via comm2 device (240 in the figures) of platform 3 (215 in the figures).

Figure 3:
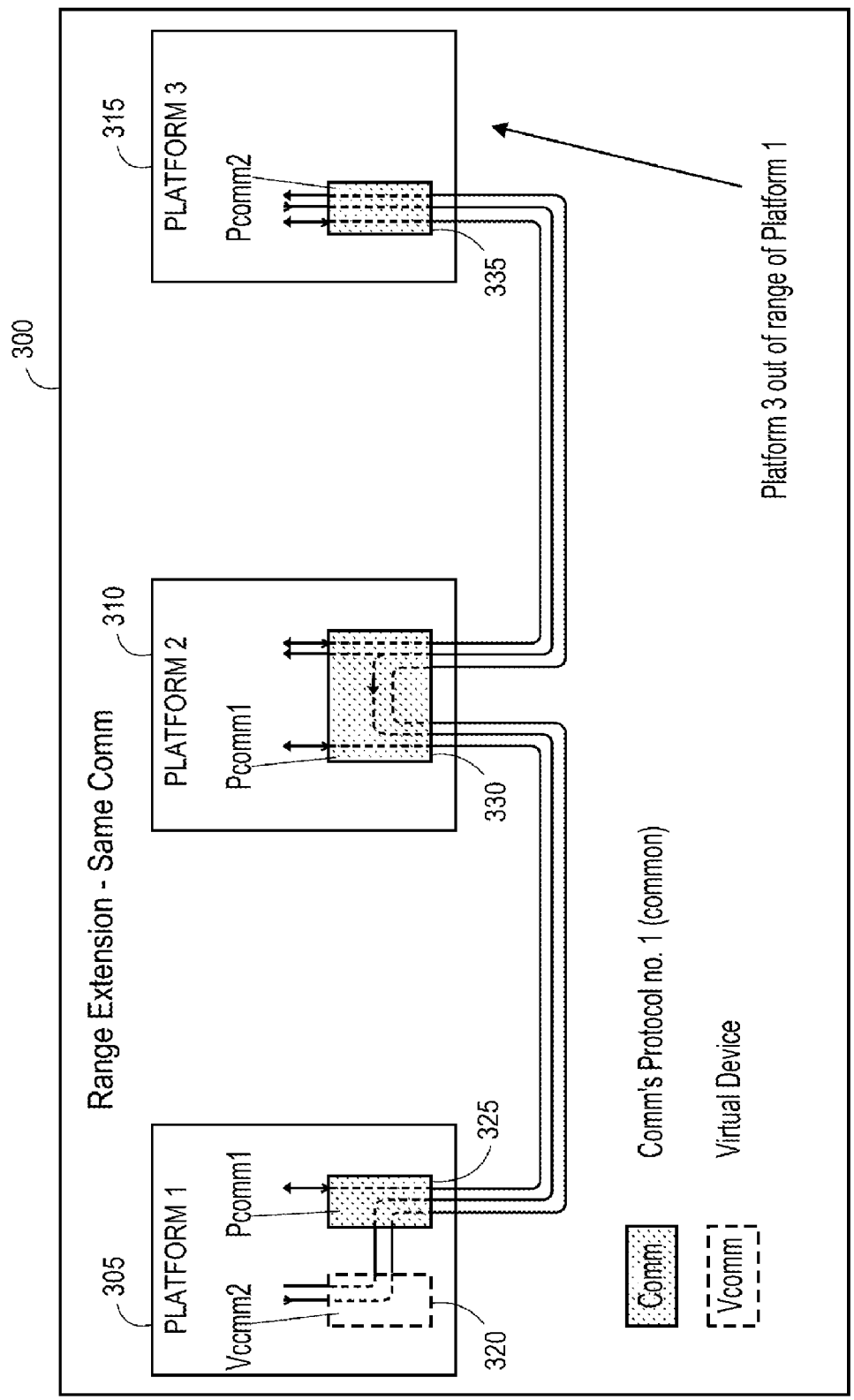
FIG. 3 illustrates a Comm's Cloud used for range extension, connecting to out-of-range Platform 3 according to embodiments of the present invention.

FIG. 3 at 300 depicts a network diagram of the "range extension" use case, in which Platform 1 (305 in the figures) is out-of-range of Platform 3 (315 in the figures) (which may be an Access Point, for example), but Platform 2 (310 in the figures) is within range of both Platform 1 (305 in the figures) and Platform 3 (315 in the figures). In this case, a virtual Comm1 device is created within Platform 1 (in addition to the already existing physical Comm 1 device embedded in the platform), which is a copy of the Comm1 device on Platform 2 (and maintained using a link between the physical Comm1 devices). This virtual Comm1 device 320 (since it is a copy of a device within range of Platform 3 (315 in the figures)) enables Platform 1 (305 in the figures) to connect to the out-of-range Platform 3 (315 in the figures). This scenario can be implemented without actually creating a "virtual device" on Platform no. 1, but rather by "adding" the acquired capabilities to the already-existing (physical) Comm1 device 325 (Pcomm1) of Platform 1 (305 in the figures), Comm1 device 330 (Pcomm1) of Platform 2 (310 in the figures) and Comm1 (335 in the figures) device (Pcomm2) of Platform 3 (315 in the figures). This would require a different behavior from the device driver, but is inherently the same as with the added virtual Comm1 device.

Figure 4:
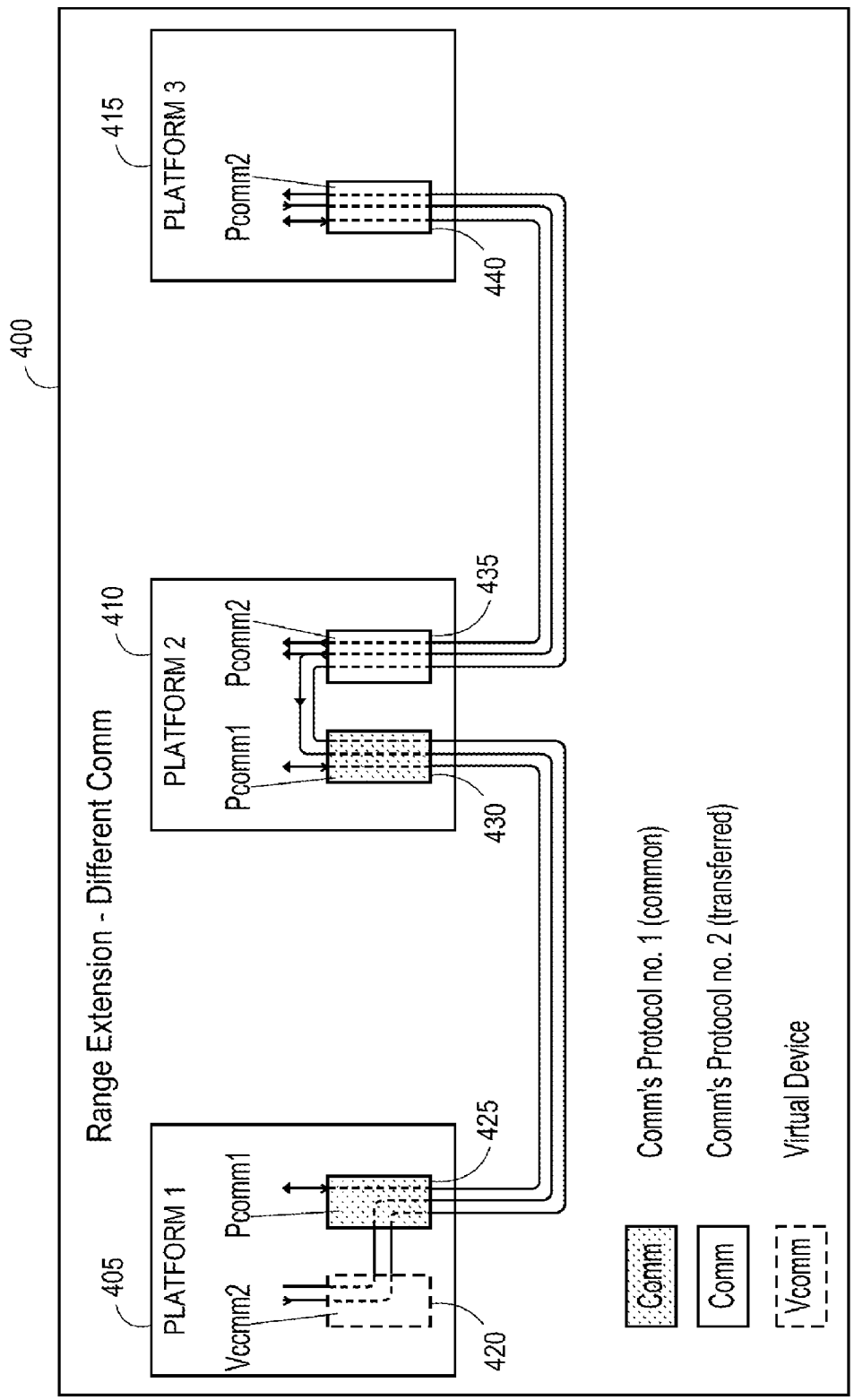
FIG. 4 illustrates a Comm's Cloud used for Range Extension, connecting to out-of-range Platform 3, using a different comm according to embodiments of the present invention.

FIG. 4 at 400 depicts a different "range extension" use-case, in which the link through which the virtual connection to Pcomm2 (420 in the figures) and Pcomm2 (440 in the figures) is maintained is over a different communications protocol (i.e. Pcomm 1 (425 in the figures) of platform 1 (405 in the figures) and Pcomm 1 of platform 2 (410 in the figures)) than the one Platform 3 (e.g. the Access Point) is using (i.e. Pcomm 2 (435 in the figures) of Platform 2 (410 in the figures) and Pcomm2 (440 in the figures) of Platform 3 (415 in the figures)).

Figure 5:
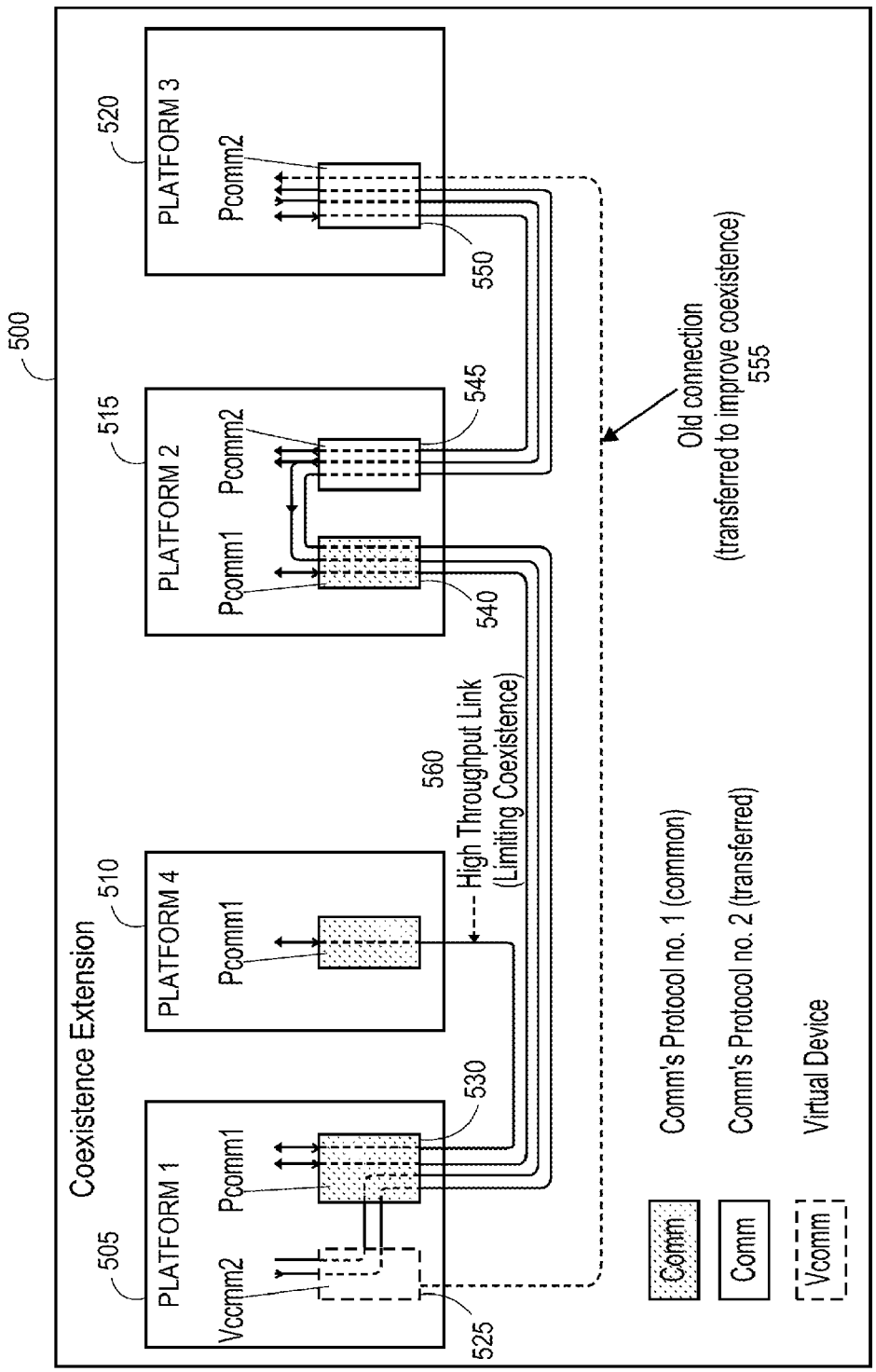
FIG. 5 illustrates a Comms Cloud used for coexistence, where connection to Platform 3 is transferred to Platform 2 according to embodiments of the present invention.

FIG. 5 at 500 provides for a scenario where Platform 1 (505 in the figures) is connected to both Platform 3 (520 in the figures) and Platform 4 (510 in the figures) (via different communications protocols—e.g. WiFi web-surfing and BT headset) in a "coexistence extension" use case. In this case, in order to improve coexistence, the lower-throughput link 555 between the physical Comm2 (525 and 550 in the figures) devices on Platform 1 (505 in the figures) and Platform 3 (520 in the figures) is "transferred" through a higher-throughput link 535 between the physical Comm1 devices (530 and 540 in the figures) on Platform 1 (505 in the figures) and Platform 2 (515 in the figures), using the physical Comm2 device (545 in the figures) on Platform 2 (515 in the figures). Thus, the isolation between the original links is improved, and the "new" coexistence problem created on Platform 2 (515 in the figures) (only having to relay data between Comm1 (540 in the figures) and Comm2 (545 in the figures)) is much simpler than the original coexistence problem on Platform 1 (505 in the figures) (having unsynchronized, non-related data streams coming through both devices).

Figure 6:
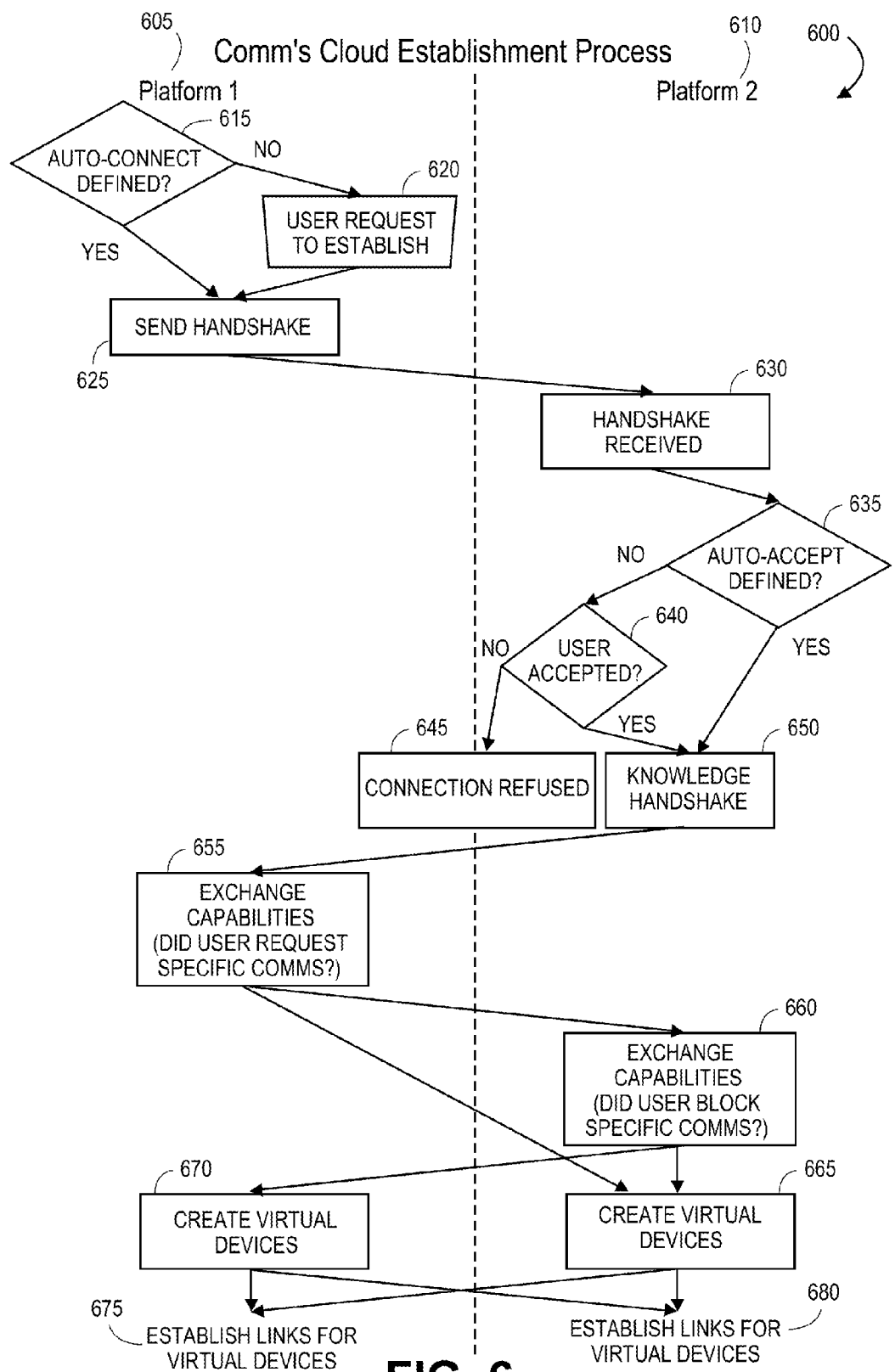
FIG. 6 illustrates a Comm's Cloud link establishment process according to embodiments of the present invention.

FIG. 6 at 600 provides a process flow-chart for the link-establishment process required for embodiments of the present invention. It is understood that the flow presented is an example, and other implementations may be possible. In this process, Platform 1 (605 in the figures) is the "initiator" and Platform 2 (610 in the figures) is the "responder". If a user requests to initiate a Comm's Cloud connection 620 (or if Auto-Connect 615 is defined in the system with a specified time-interval between attempts) a "handshake" is sent 625 to the "responder" platform and received at 630. If the user using Platform 2 (610 in the figures) accepts the connection at 640 (or if Auto-Connect is defined at 635 in the system for Platform 2 (610 in the figures) as well), the handshake is acknowledged 650, and the two platforms exchange their capabilities 655 and 660 (if the user of Platform no. 2 (610 in the figures) does not wish to connect, or Auto-Connect is not defined and the user does not respond to the request, the connection is refused and not established 645). This capability exchange includes a facility for the user of the "initiator" platform to ask for specific capabilities it would like to receive from the "responder" platform, as well as a facility for the user of the "responder" platform to block certain capabilities from sharing. Once the capability exchange is complete, virtual devices for the relevant features are created on each platform (Platform 1 (605 at 670 in the figures) and Platform 2 (610 at 665 in the figures)), and the link through the common communication protocol(s) that will be used to maintain them are established for Platform 1 (610 at 675 in the figures) and Platform 2 (610 at 680 in the figures).

Embodiments of the present invention may further provide a non-volatile computer readable medium encoded with computer executable instructions, which when accessed, cause a machine to perform operations comprising, augmenting a wireless platform's functionality by sharing wireless resources by adapting the wireless platform for communication with at least one additional wireless platform, wherein the wireless platform and the at least one additional wireless platform each have their own set of wireless communication devices and capabilities, wherein at least one of the wireless communication devices and capabilities are in common between the wireless platform and the at least one additional wireless platform and wherein when the at least one wireless platform and the at least one additional wireless platform are within communication range of each other or are on at least one common wireless communication protocol, the wireless platform is capable of virtualizing to the wireless platform some or all wireless devices and capabilities available on the at least one additional wireless platform.

Also, embodiments of the present invention may provide a system utilizing techniques for augmented functionality by sharing wireless resources, comprising a first wireless platform, a second wireless platform adapted for communication with the first wireless platform, wherein the first wireless platform and the second wireless platform each have their own set of wireless communication devices and capabilities, wherein at least one of the wireless communication devices and capabilities are in common between the first wireless platform and the second wireless platform; and wherein when first wireless platform and the second wireless platform are within communication range of each other or are on at least one common wireless communication protocol, the first wireless platform is capable of virtualizing to the first wireless platform some or all wireless devices and capabilities available on the second wireless platform.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
    a wireless platform adapted for communication with at least one additional wireless platform, wherein said wireless platform and said at least one additional wireless platform each have their own set of wireless communication devices and capabilities, wherein at least one of said wireless communication devices and capabilities are in common between said wireless platform and said at least one additional wireless platform; and
    virtual device to virtualize to said wireless platform some or all wireless devices and capabilities available on said at least one additional wireless platform when said wireless platform and said at least one additional wireless platform are within communication range of each other or are on at least one common wireless communication protocol,
    wherein said wireless platform virtualizing to said wireless platform some or all wireless devices and capabilities available on said at least one additional wireless platform enables range extension such that a range of said at least one additional wireless platform is virtualized to said wireless platform by enabling a link through which a virtual connection to a further additional wireless platform over a same or different communications protocol than said further additional wireless platform is using.

2. The apparatus of claim 1, wherein when virtualizing to said wireless platform some or all wireless devices and capabilities available on said at least one additional wireless platform, said wireless platform is adapted to seamlessly use devices and capabilities which are physically on said at least one additional wireless platform and to connect to other platforms or access devices which are within range of said at least one additional platform and to transfer connections to other devices to said at least one additional wireless platform.

3. The apparatus of claim 1, wherein said apparatus is adapted to create a virtual device on said wireless platform which is a copy of said at least one additional wireless platform and wherein said virtual device is maintained and used by transferring data over a communication link between said wireless platform and said at least one additional wireless platform.

4. The apparatus of claim 3, wherein said wireless devices and capabilities available on said at least one additional wireless platform are capable of being either physically separate devices, or a plurality of communications devices integrated into a same module, or in a single multi-communication chip.

5. The apparatus of claim 1, further comprising a combination of hardware and/or software capabilities in a first device on said wireless platform and its device driver, that is capable of supporting the creation of virtual devices on said wireless platform as seen by an operating system.

6. The apparatus of claim 5, further comprising a combination of hardware and/or software capabilities in said first device on said wireless platform and said device driver to create and maintain a link/tunnel between said first device on said wireless platform and a first device on said at least one additional wireless platform, which is dedicated for routing data between a second device on said at least one additional wireless platform and a virtual copy on said wireless platform.

7. The apparatus of claim 6, further comprising a combination of hardware and/or software capabilities in said first device and its device driver and said virtual device on said wireless platform that route data traffic between said virtual device and said operating system, making use of said link/tunnel to said second device on said at least one additional wireless platform.

8. The apparatus of claim 7, further comprising a combination of hardware and/or software capabilities in said first and said second device on said at least one additional wireless platform and their device driver(s) to create and maintain a link/tunnel between said first and said second devices on said at least one additional wireless platform, which is dedicated for routing data between said second device on said at least one additional wireless platform and its virtual copy on said wireless platform.

9. The apparatus of claim 8, further comprising a combination of hardware and/or software capabilities in said first and second devices on said at least one additional wireless device and their device driver(s) to route data to and from said second device on said at least one additional wireless platform from and to either said wireless platform or said at least one additional wireless platform through said first device on said at least one additional wireless platform or both.

10. The apparatus of claim 1, wherein said wireless platform virtualizing to said wireless platform some or all wireless devices and capabilities available on said at least one additional wireless platform enables feature extension such that a desired feature of said at least one additional wireless platform is virtualized to said wireless platform.

11. A method for augmented functionality by sharing wireless resources, comprising:
    using a wireless platform adapted for communication with at least one additional wireless platform, wherein said wireless platform and said at least one additional wireless platform each have their own set of wireless communication devices and capabilities, wherein at least one of said wireless communication devices and capabilities are in common between said wireless platform and said at least one additional wireless platform; and
    if said wireless platform and said at least one additional wireless platform are within communication range of each other or are on at least one common wireless communication protocol, then virtualizing to said wireless platform some or all wireless devices and capabilities available on said at least one additional wireless platform;
    wherein said wireless platform virtualizing to said wireless platform some or all wireless devices and capabilities available on said at least one additional wireless platform enables range extension such that a range of said at least one additional wireless platform is virtualized to said wireless platform by enabling a link through which a virtual connection to a further additional wireless platform over a same or different communications protocol than said further additional wireless platform is using.

12. The method of claim 11, wherein when virtualizing to said wireless platform some or all wireless devices and capabilities available on said at least one additional wireless platform, said wireless platform is adapted to seamlessly use devices and capabilities which are physically on said at least one additional wireless platform and to connect to other platforms or access devices which are within range of said at least one additional platform and to transfer connections to other devices to said at least one additional wireless platform.

13. The method of claim 11, wherein said apparatus is adapted to create a virtual device on said wireless platform which is a copy of said at least one additional wireless platform and wherein said virtual device is maintained and used by transferring data over a communication link between said wireless platform and said at least one additional wireless platform.

14. The method of claim 13, wherein said wireless devices and capabilities available on said at least one additional wireless platform are capable of being either physically separate devices, or two communications devices integrated into a same module, or in a same multi-communication chip.

15. The method of claim 11, further comprising a combination of hardware and/or software capabilities in a first device on said wireless platform and its device driver, that is capable of supporting the creation of virtual devices on said wireless platform as seen by an operating system.

16. The method of claim 15, further comprising a combination of hardware and/or software capabilities in said first device on said wireless platform and said device driver to create and maintain a link/tunnel between said first device on said wireless platform and a first device on said at least one additional wireless platform, which is dedicated for routing data between a second device on said at least one additional wireless platform and a virtual copy on said wireless platform.

17. The method of claim 16, further comprising a combination of hardware and/or software capabilities in said first device and its device driver and said virtual device on said wireless platform that route data traffic between said virtual device and said operating system, making use of said link/tunnel to said second device on said at least one additional wireless platform.

18. The method of claim 17, further comprising a combination of hardware and/or software capabilities in said first and said second device on said at least one additional wireless platform and their device driver(s) to create and maintain a link/tunnel between said first and said second devices on said at least one additional wireless platform, which is dedicated for routing data between said second device on said at least one additional wireless platform and its virtual copy on said wireless platform.

19. The method of claim 18, further comprising a combination of hardware and/or software capabilities in said first and second devices on said at least one additional wireless device and their device driver(s) to route data to and from said second device on said at least one additional wireless platform from and to either said wireless platform or said at least one additional wireless platform through said first device on said at least one additional wireless platform or both.

20. The method of claim 11, wherein said wireless platform virtualizing to said wireless platform some or all wireless devices and capabilities available on said at least one additional wireless platform enables feature extension such that a desired feature of said at least one additional wireless platform is virtualized to said wireless platform.

21. A non-volatile computer readable medium encoded with computer executable instructions, which when accessed, cause a machine to perform operations comprising:

augmenting a wireless platform's functionality by sharing wireless resources by adapting said wireless platform for communication with at least one additional wireless platform, wherein said wireless platform and said at least one additional wireless platform each have their own set of wireless communication devices and capabilities, wherein at least one of said wireless communication devices and capabilities are in common between said wireless platform and said at least one additional wireless platform; and if said wireless platform and said at least one additional wireless platform are within communication range of each other or are on at least one common wireless communication protocol, then virtualizing to said wireless platform some or all wireless devices and capabilities available on said at least one additional wireless platform;

wherein said wireless platform virtualizing to said wireless platform some or all wireless devices and capabilities available on said at least one additional wireless platform enables range extension such that a range of said at least one additional wireless platform is virtualized to said wireless platform by enabling a link through which a virtual connection to a further additional wireless platform over a same or different communications protocol than said further additional wireless platform is using.

22. The non-volatile computer readable medium encoded with computer executable instructions of claim 21, wherein when virtualizing to said wireless platform some or all wireless devices and capabilities available on said at least one additional wireless platform, said wireless platform is adapted to seamlessly use devices and capabilities which are physically on said at least one additional wireless platform and to connect to other platforms or access devices which are within range of said at least one additional platform and to transfer connections to other devices to said at least one additional wireless platform.

23. The non-volatile computer readable medium encoded with computer executable instructions of claim 21, wherein said apparatus is adapted to create a virtual device on said wireless platform which is a copy of said at least one additional wireless platform and wherein said virtual device is maintained and used by transferring data over a communication link between said wireless platform and said at least one additional wireless platform.

24. The non-volatile computer readable medium encoded with computer executable instructions of claim 23, wherein said wireless devices and capabilities available on said at least one additional wireless platform are capable of being either physically separate devices, or two communications devices integrated into a same module, or in a same multi-communication chip.

25. A system utilizing techniques for augmented functionality by sharing wireless resources, comprising:
a first wireless platform;
a second wireless platform adapted for communication with said first wireless platform, wherein said first wireless platform and said second wireless platform each have their own set of wireless communication devices and capabilities, wherein at least one of said wireless communication devices and capabilities are in common between said first wireless platform and said second wireless platform; and
virtual device to virtualize to said first wireless platform some or all wireless devices and capabilities available on said second wireless platform when said first wireless platform and said second wireless platform are within communication range of each other or are on at least one common wireless communication protocol;

wherein said first wireless platform virtualizing to said first wireless platform some or all wireless devices and capabilities available on said second wireless platform enables range extension such that a range of said second wireless platform is virtualized to said first wireless platform by enabling a link through which a virtual connection to a second wireless platform over a same or different communications protocol than said second wireless platform is using.

26. The system of claim 25, wherein when virtualizing to said first wireless platform some or all wireless devices and capabilities available on said second wireless platform, said first wireless platform is adapted to seamlessly use devices and capabilities which are physically on said second wireless platform and to connect to other platforms or access devices which are within range of said second platform and to transfer connections to other devices to said second wireless platform.

27. The system of claim 26, wherein said first wireless platform is adapted to create a virtual device which is a copy of said second wireless platform and wherein said virtual device is maintained and used by transferring data over a communication link between said first wireless platform and said second wireless platform.

* * * * *